US 6,648,672 B1

(12) United States Patent
Meinke (10) Patent No.: US 6,648,672 B1
(45) Date of Patent: Nov. 18, 2003

(54) RAPID ELECTRICAL CONNECTOR SYSTEM (75) Inventor: Martin Meinke, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/089,940

(22) PCT Filed: Sep. 11, 2000

(86) PCT No.: PCT/DE00/03146

§ 371 (c)(1),
(2), (4) Date: Apr. 5, 2002

(87) PCT Pub. No.: WO01/26197

PCT Pub. Date: Apr. 12, 2001

(30) Foreign Application Priority Data

Oct. 5, 1999 (DE) .......................................... 199 47 834

(51) Int. Cl.⁷ ............................................... H01R 11/20
(52) U.S. Cl. ..................... 439/422; 439/380; 439/76.2; 439/705; 439/949; 439/425
(58) Field of Search ................................ 439/380, 381, 439/410, 422, 76.2, 705, 426, 425, 432, 949

(56) References Cited

U.S. PATENT DOCUMENTS

| | | | |
|---|---|---|---|
| 5,855,491 A | * | 1/1999 | Hintner et al. ............... 439/409 |
| 5,934,930 A | * | 8/1999 | Camps et al. ................ 439/425 |
| 6,142,815 A | * | 11/2000 | Whiteman et al. ........... 439/381 |
| 6,232,557 B1 | * | 5/2001 | Lounsbury et al. ....... 174/117 F |

FOREIGN PATENT DOCUMENTS

| | | |
|---|---|---|
| DE | 195 25 438 A1 | 1/1997 |
| DE | 196 30 352 A1 | 1/1998 |
| DE | 198 14 810 C1 | 6/1999 |
| EP | 0 665 608 A3 | 8/1995 |
| EP | 0 665 608 A2 | 8/1995 |
| EP | 0 821 434 A1 | 1/1998 |

* cited by examiner

*Primary Examiner*—Tho D. Ta
*Assistant Examiner*—Truc Nguyen
(74) *Attorney, Agent, or Firm*—Harness, Dickey & Pierce, P.L.C.

(57) ABSTRACT

A rapid electrical connection system is made up of a mounting plate for securing form-coded flat cables, an intermediate carrier serving as a power socket and a device adapter which can be swiveled on, in particular a load feeder capable of communication, as the main components. The flat cable for the power connection and the flat cables for signal transmission and backup power supply, are all contacted by penetrative contacting. The electrical connection of the device adapter takes place during the swiveling-on action.

25 Claims, 7 Drawing Sheets

RAPID ELECTRICAL CONNECTOR SYSTEM

This application is the national phase under 35 U.S.C. §371 of PCT International Application No. PCT/DE00/03146 which has an International filing date of Sep. 11, 2000, which designated the United States of America, the entire contents of which are hereby incorporated by reference.

FIELD OF THE INVENTION

The invention generally relates to a rapid electrical connection system. More preferably, it relates to a system with a lower part, on which main power lines for the main power connection, signal lines and/or backup power lines can be secured. In addition, the system can include a device adapter, which can be swiveled onto the lower part and has first contact elements, which create an electrical connection with the main power lines, the signal lines and/or backup power lines when the device adapter is swiveled onto the lower part.

Furthermore, the invention generally relates to a method for the rapid connection of a device adapter, in particular a load feeder, to main power lines for the main power connection, signal lines and/or backup power lines, which are configured, for example, as form-coded flat cables.

BACKGROUND OF THE INVENTION

A rapid electrical connection system is disclosed in DE 195 25 438 A1. The bus bar adapter system described here serves for the connection of, for example, a motor feeder. It is made up of a base part with securing elements for receiving power rails and a trough-shaped upper part. By hooking in and swiveling on the trough-shaped upper part, on which a motor feeder is fastened, contact with the power rails, and consequently at the same time with the electrical connection of the motor branch, is established. The power rails serve for the main power connection and for the backup power supply. Furthermore, the base part is provided with a multipole bus rail, if communication with intelligent switchgear is intended.

EP 0 655 608 A2 discloses a flat cable with an associated connection device. The flat cable contains bus signal lines and main power lines. With a cable arrangement of this type, the specific supply requirements of industrial process users can only be met inadequately or under aggravated conditions. For sensors, for example sonar sensors, light barriers, limit switches etc., a two-conductor connection is adequate. Actuators capable of communication, for example solenoid valves, require a four-conductor connection, load feeders capable of communication must be supplied by means of at least 8 conductors, 2 bus cores, 2 backup power lines and 4 main power lines.

With main power lines and signal lines routed close together in parallel, cost-intensive measures have to be taken to avoid coupled-in interference, for example additional shielding of the signal lines.

While a core cross section of 1.5 mm$^2$ is adequate for a bus signal connection and a backup power connection, the core cross section for main power lines for the purpose of power distribution must be at least 4 mm$^2$. However, with a common flat ribbon cable, different wire cross sections and component-appropriate cable feeding can only be realized with difficulty. Moreover, as the number of cores increases, the exact assignment of the contacting elements to the individual cores is made more difficult.

For economic reasons alone, this type of contacting should be made to match the current intensity respectively to be transferred. For data transmission and supplying to sensors, current intensities of less than 100 mA at around 24 V DC are adequate. Actuators are generally supplied with 24 V DC and current intensities of less than 2 mA. In the region of the main power connection, the contact points must transfer nominal currents of up to 12 A at 400 V AC voltage. These contact points must, moreover, be able to handle the different maximum short-circuit currents occurring on account of the conditions of the installation, from 10 to 20 A in the data and backup power circuit and several 1000 A in the main circuit. The simultaneous use of the penetrative technique for main power, backup power and bus signal lines in only one operation, that is the swiveling-on movement, has failed until now because the forces required for this cannot be produced by a single swiveling movement. The exact assignment of contacting points to the main power lines required for sound contact-making would be scarcely possible with such a swiveling-on action.

SUMMARY OF THE INVENTION

An object of an embodiment of the invention is to provide a rapid electrical connection system which permits in a simple rapid connection of device adapters to main power lines, signal lines and/or backup power lines and also a rapid exchange of a complete device adapter.

A further object of an embodiment of the invention is to specify a method for the rapid connection of a device adapter, in particular a load feeder, to main power lines for the main power connection, signal lines and/or backup power lines, which are configured as form-coded flat cables.

A solution for achieving an object can be provided by at least one of the following features:

a) the lower part is configured as a mounting plate, b) the mounting plate has recesses for receiving form-coded flat cables with main power lines, signal lines and/or backup power lines, c) the mounting plate is connected in the region of the recess for receiving the flat cable for the main power connection to an intermediate carrier, d) the intermediate carrier has on its side facing this recess first contact prongs for the penetrative contacting of a flat cable which can be placed into this recess for the main power connection, the intermediate carrier has on its side facing the device adapter electrically conducting contact bushes, e) the contact bushes are respectively connected in an electrically conducting manner to one of the first contact prongs and f) the contact bushes are adapted to first contact elements, configured as contacting pins, for receiving them with positive engagement.

Such a solution can include separate laying of signal lines and power circuit lines, which is particularly advantageous for avoiding coupled-in interference.

Furthermore, contact elements adapted to the different current intensities can be used and coupled-in interference of signal lines caused by main power lines can be prevented.

An advantageous development of an embodiment of the invention exists if some of the first contact elements are configured as second contact prongs for the penetrative contacting of flat cables which can be placed in the recesses of the mounting plate for signal transmission or backup power supply. This indicates that different contact elements can be used for the contacting of the main power lines and the signal lines or backup power lines.

It is particularly advantageous if the device adapter is configured as a load feeder.

BRIEF DESCRIPTION OF THE DRAWINGS

An exemplary embodiment of the invention is explained in more detail below with reference to the drawings, in which.

DETAILED DESCRIPTION OF THE PREFERRED EMBODIMENTS

Figure 1:
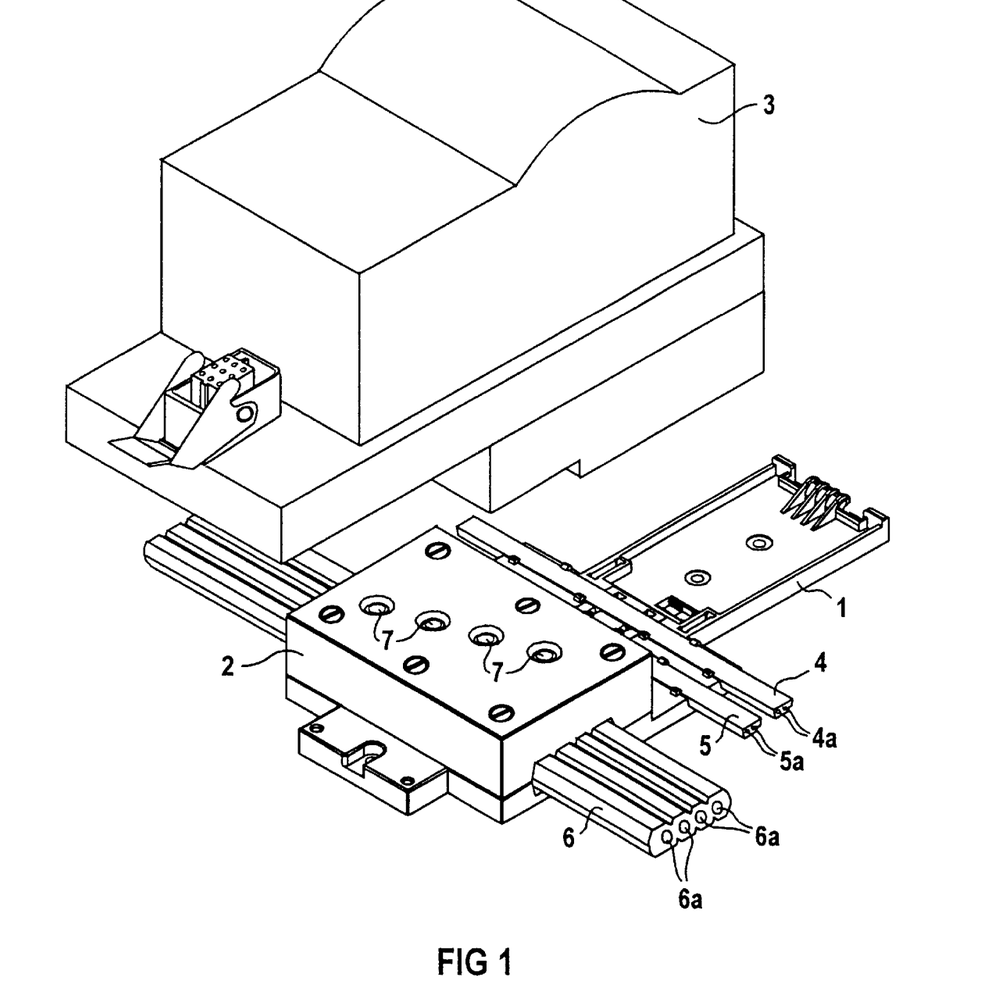
FIG. 1 shows a perspective view of a rapid electrical connection system according to an embodiment of the invention with a mounting plate, an intermediate carrier and a device adapter which can be swiveled on, FIG. 2 shows a front view of the mounting plate according to FIG. 1.

According to FIG. 1, the rapid electrical connection system according to an embodiment of the invention is substantially made up of a lower part, designed as a mounting plate 1, an intermediate carrier 2 mounted on the latter and a device adapter 3, here a load feeder. The load feeder 3 can be swiveled onto the mounting plate 1 and the intermediate carrier 2. During swiveling-on, an electrical connection is established between form-coded flat cables, here a form-coded two-wire line 4 with bus signal lines 4a for data transmission, a form-coded two-wire line 5 with line cores 5a for the backup power supply and a form-coded flat cable 6 with main power lines 6a for the main power connection, which are held on the mounting plate 1, and the electrical connections of the device adapter 3. In this case, the intermediate carrier 2 serves as a power socket with contact bushes 7, into which contact pins, not visible here, as connections on the underside of the device adapter 3 enter during the swiveling-on action. Insert bushes 7 are understood as also meaning bush-like receptacles.

Figure 2:
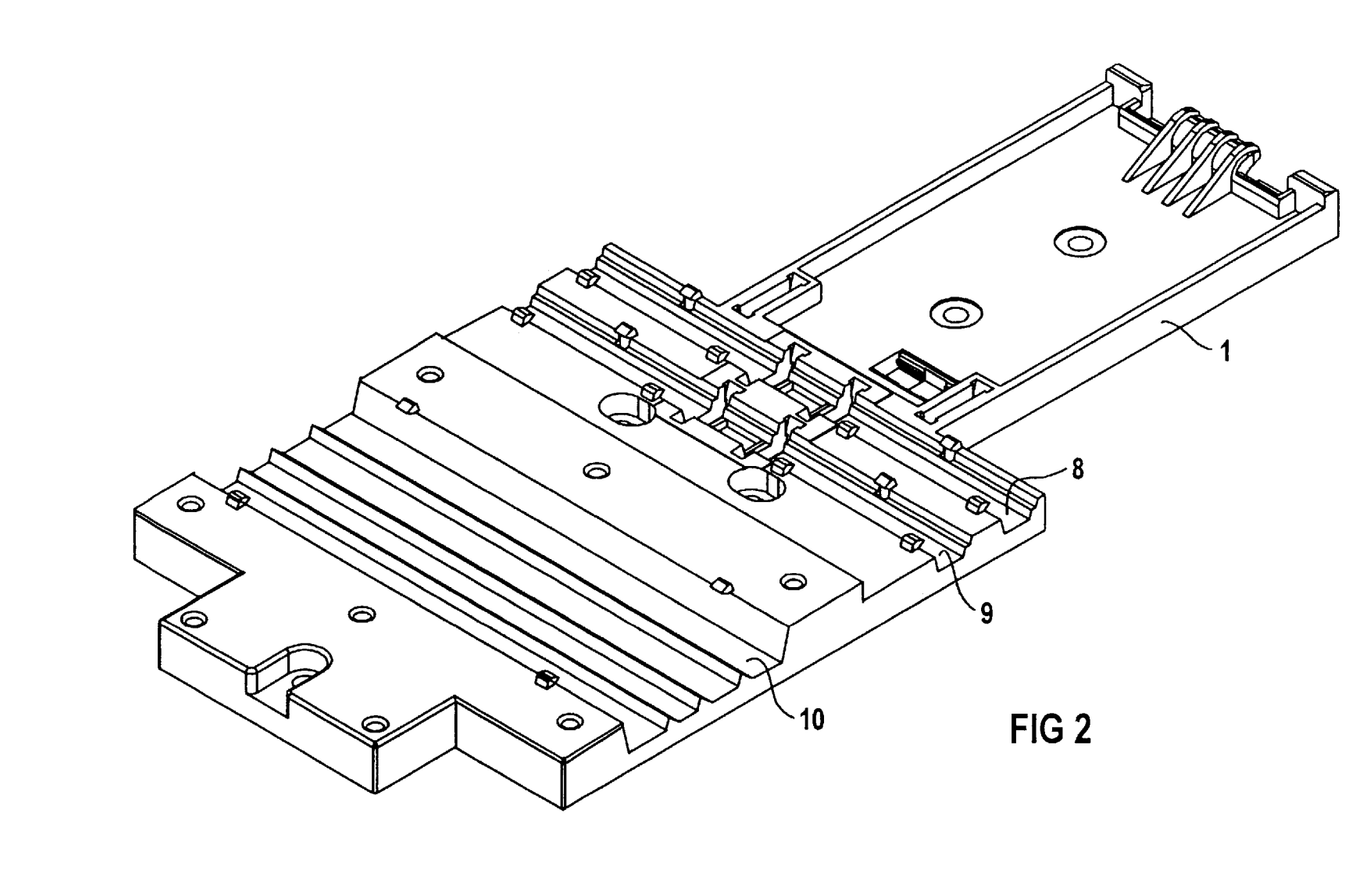
Figure 3:
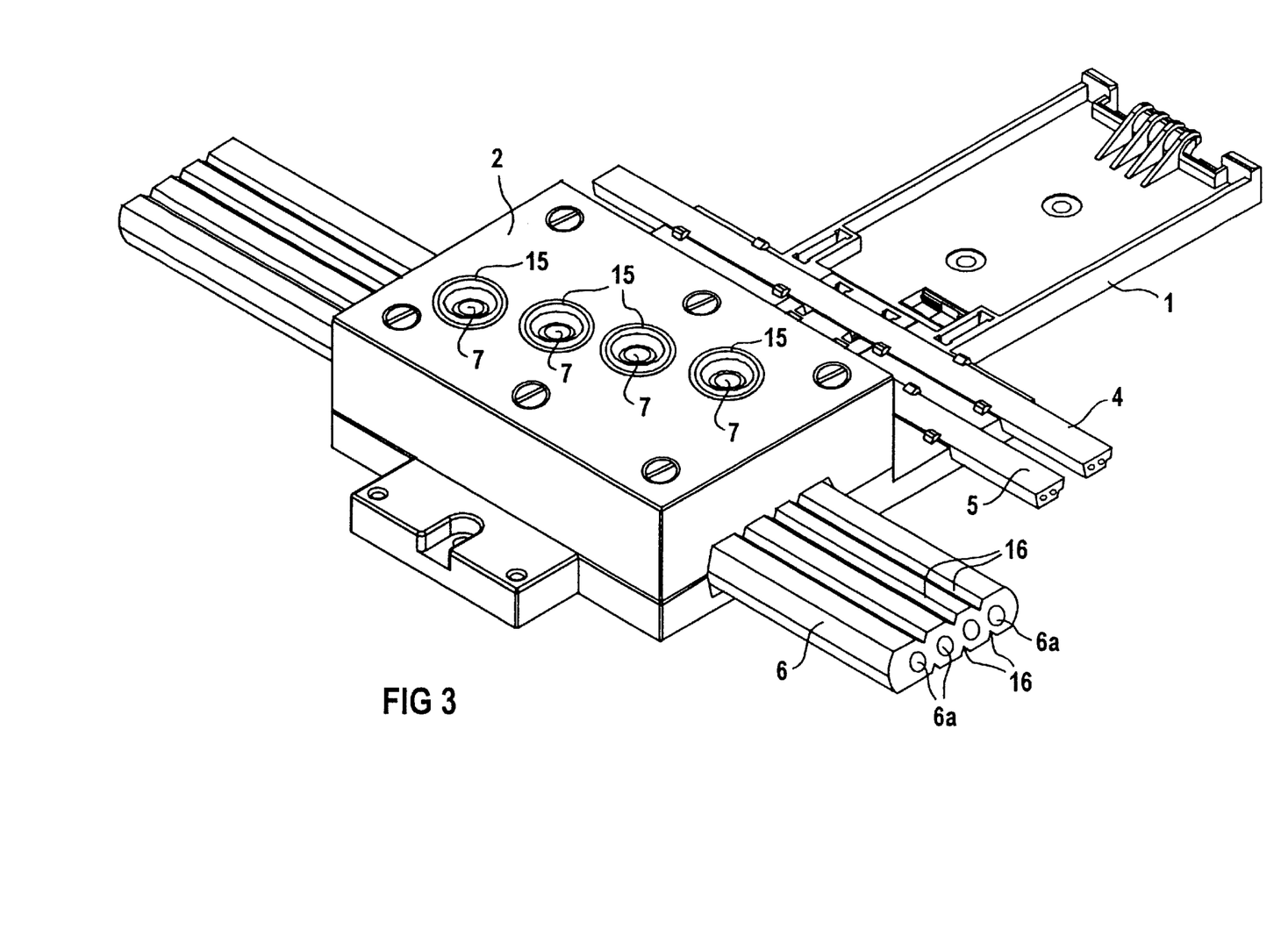
FIG. 3 shows a front view of the mounting plate according to FIG. 1 with placed-in flat cables and mounted intermediate carrier.

For securing the flat cables 4, 5 and 6, the mounting plate 1 according to FIGS. 2, 3 has recesses 8, 9 and 10 adapted to the form coding. The mounting plate 1 thus serves both as a holding device for the flat cables 4, 5 and 6 and for the mounting of the complete load feeder 3. The contacting of the flat cables 4, 5 and 6 takes place by the penetrative technique, the contacting of the bus signal lines 4a and of the auxiliary power lines 5a taking place directly when the load feeder 3 is swiveled on.

Figure 5:
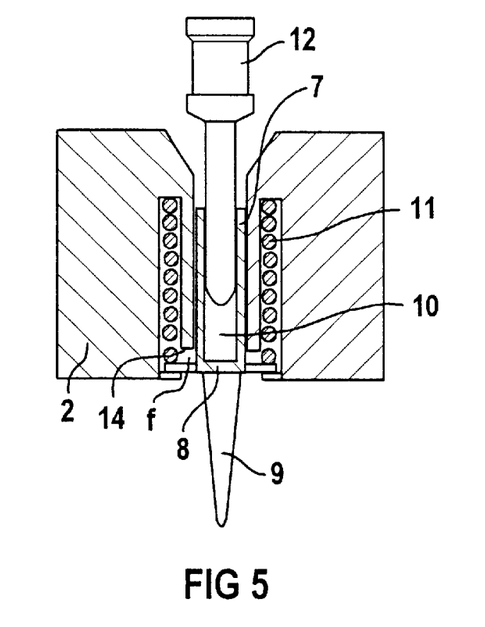
FIG. 5 shows a sectional view of a region of the intermediate carrier with a resiliently mounted contact element.
Figure 6:
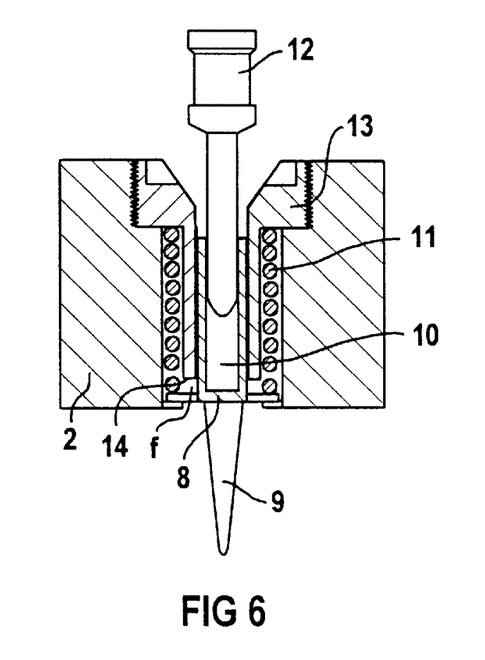
FIG. 6 shows a sectional view of a region of the intermediate carrier with a contact element resiliently mounted usingI isolated threaded bolts.

The contacting of the main power lines 6a is performed in an operation carried out beforehand, preferably by firmly screwing the intermediate carrier 2 on the mounting plate 1 according to FIG. 3, by means of adapted, resiliently mounted contact elements 8, which according to FIGS. 5 and 6 are arranged in the intermediate carrier 2, which can be firmly connected to the mounting plate 1. The contact elements 8 have the contact bushes 7 on the rear side.

Figure 4:
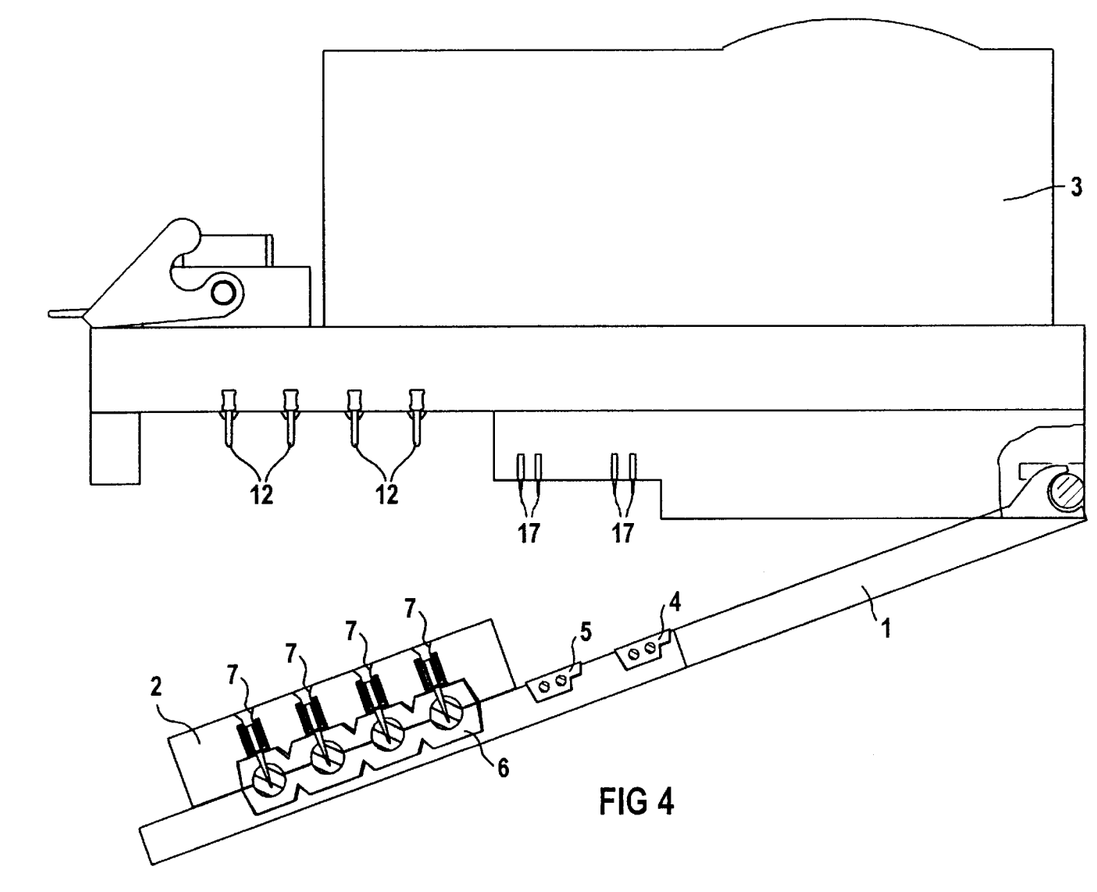
FIG. 4 shows a side view of the device adapter according to FIG. 1.

FIG. 4 shows a side view of the load feeder 3 with contacting pins 12 for establishing contact with the contact bushes 7 of the intermediate carrier 2. In addition, contact prongs 17, which serve for the direct penetrative contacting of the flat cables 4 and 5 during the swiveling-on operation, protrude on the underside of the load feeder.

According to FIG. 5, preferably one-part, annularly symmetrical contact elements 8 with a contact tip 9 at the lower end and an opening 10, configured as a contact bush 7, at the upper end are used for the contacting by the penetrative technique. These contact elements 8 are resiliently mounted within the intermediate carrier 2 in such a way that, when the contact elements 8 penetrate the cable sheath of the flat cable 6 for the main power connection, there is a nonpositive connection between the contact elements 8 and the intermediate carrier 2, whereas in the mounted state adequate spring excursion remains for re-adjustment of the contact elements 8 to compensate for material shrinkages or material movements induced by changes in temperature.

The contact elements 8 are also biased within the intermediate carrier 2, by means of a respective spring element, preferably a helical spring 11, in such a way that a definite force surplus remains in addition to the frictional forces occurring between the contact bushes 7 and contact pins 12 on the load feeder 3 when the load feeder 3 is loosened, and consequently a relative movement of the contact tip 9 of the main power line 6a is prevented.

In a second configuration of the intermediate carrier 2 according to FIG. 6, the contact with the flat cable 6 for the main power connection is not established when the mounting plate 1 is connected to the intermediate carrier 2, but subsequently by the screwing-in of isolating threaded bolts 13.

The free spring excursion f of the contact elements 8 is limited according to FIGS. 5 and 6 by stops 14 in the intermediate carrier 2.

The contact bush arrangement formed on the front side of the intermediate carrier 2 in the form of a power socket, with the bushes 7, is structurally configured in such a way that adequate shock protection to conform to IP 20 is ensured both during the swiveling-on operation, i.e. when the contact pins 12 on the load feeder 3 enter the bushes 7, and when the load feeder 3 is removed.

In the embodiment according to FIG. 3, sealing elements 15 are provided, preferably in an annular form, on the upper side of the intermediate carrier 2 and on both sides of the lead-in of the flat cable 6 for the main power connection, said sealing elements ensuring at least protection class IP 65 when the load feeder 3 is fitted.

For the exact fixing of the flat cable 6 for the main power connection, the outer cable sheath is preferably configured with triangular profiles 16 between the individual line cores 6a. By asymmetrical arrangement or different depths of these profiles 16 and adapted shaping of the mounting plate 1 and of the intermediate carrier 2, it can be ensured that the flat cable 6 for the main power connection is fitted the right way round.

Figure 7:
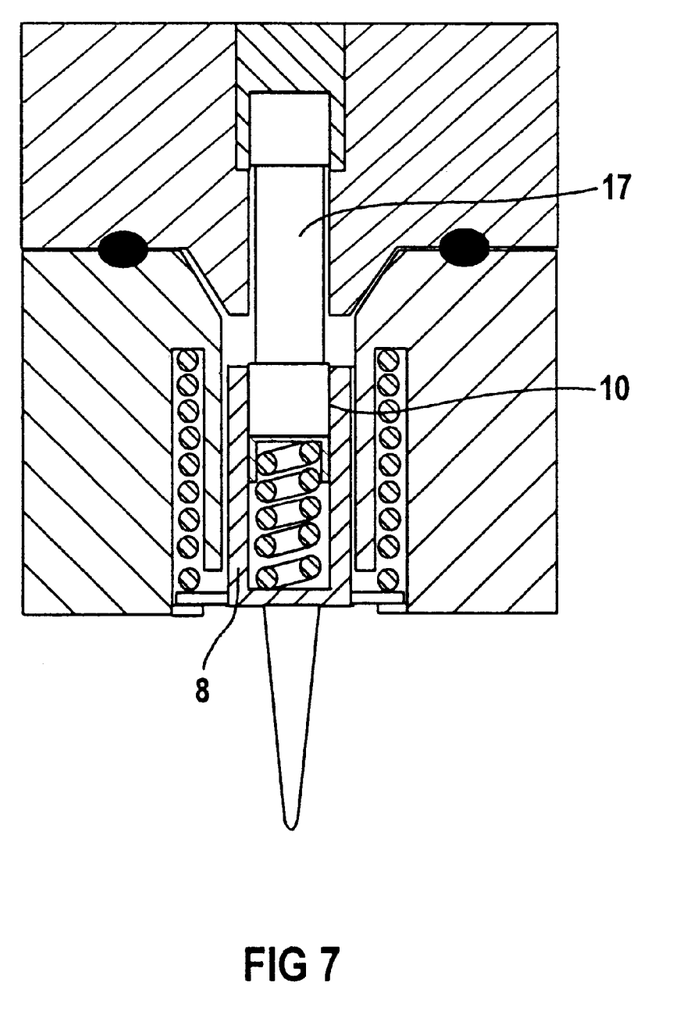
FIG. 7 shows a sectional view of the intermediate carrier according to FIGS. 5 and 6 with a short-circuit-current limiting element and FIG. 8 shows an intermediate carrier designed as a distributor.

An embodiment of the present invention also makes use of the finding that, for short-circuit-proof main power circuit coupling with the aid of the penetrative technique, there has to be in the direct vicinity of the connection a short-circuit-current limiting element. For example a fusible link or a circuit-breaker can be such an element which, in the event of a short-circuit on the feeding power line, for example a motor connection line, limits the current flowing via the contact point to a harmless amount. This short-circuit-current limiting element can be either arranged in the load feeder 3 or directly on the respective contact element 8, it being possible in the second case for the upper opening 10 of the contact element 8 to serve at the same time as a fuse holder (see FIG. 7).

Figure 8:
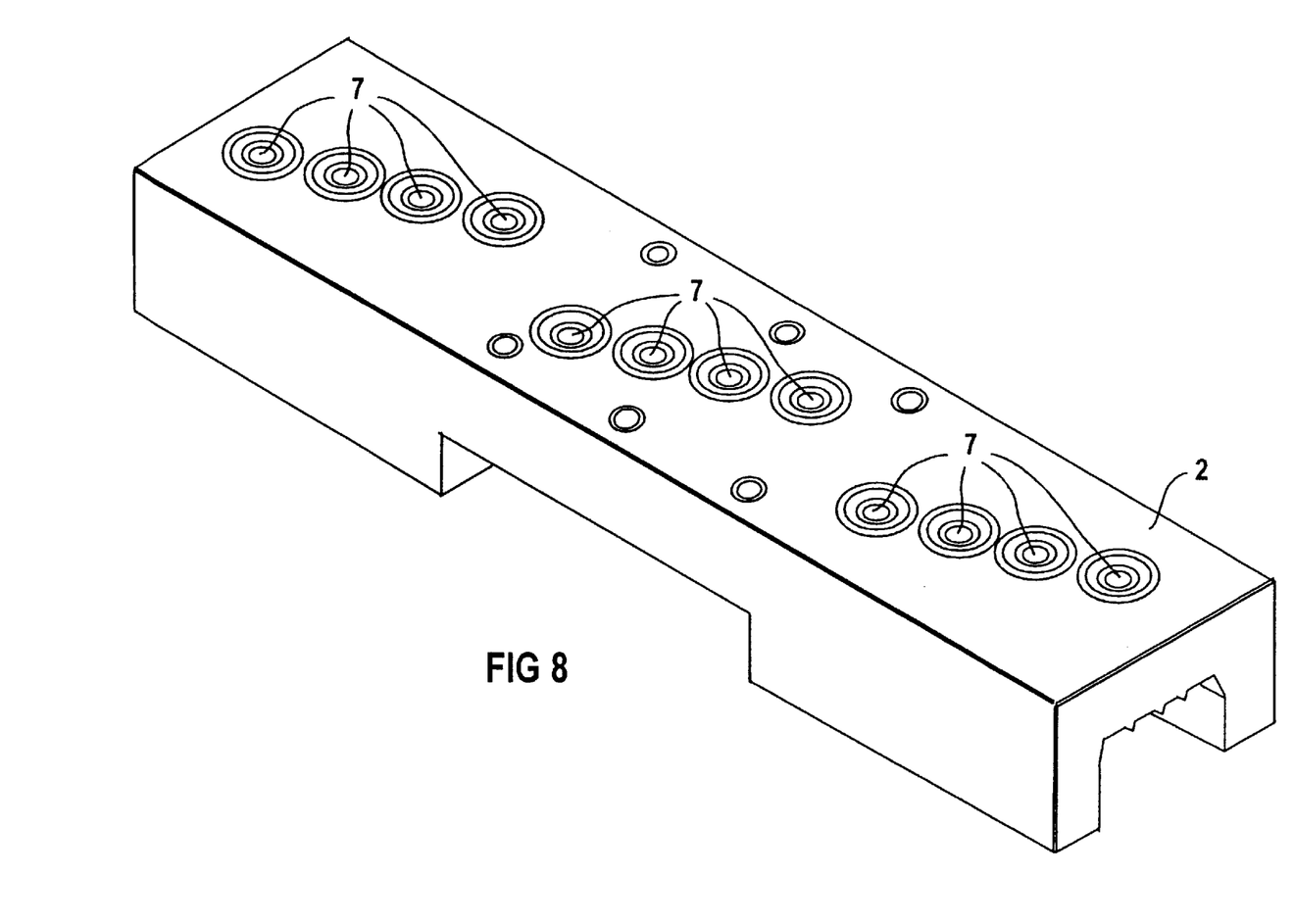

Represented in FIG. 8 is an intermediate carrier 2 of a special design, which has altogether three contact bush arrangements with contact bushes 7, the three bushes 7, lying in the line of the flat cable, respectively being connected to one another in an electrically conducting manner. Only the bushes 7 of one of the three contact bush arrangements have to be connected in an electrically conducting manner to the line cores 6a by means of penetrative contacting in the way described above. The intermediate carrier 2, designed as a distributor according to FIG. 8, accordingly permits the main power connection of three device adapters 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rapid electrical connection system, comprising:
   a lower part, on which at least one of main power lines for main power connection, signal lines and backup power lines can be secured; and
   a device adapter, which can be swiveled onto the lower part and which includes first contact elements which create an electrical connection with the at least one of main power lines, the signal lines and backup power lines when the device adapter is swiveled onto the lower part, wherein
      the lower part is configured as a mounting plate including recesses for receiving cables associated with the at least one of main power lines, signal lines and backup power lines,
      the mounting plate is connected in a region of the recess for receiving the cable for connection to an intermediate carrier,
      the intermediate carrier includes, on its side facing this recess, first contact prongs for penetrative contacting of the cable which can be placed into this recess for main power connection,
      the intermediate carrier includes, on its side facing the device adapter, electrically conducting contact bushes,
      the contact bushes are respectively connected in an electrically conducting manner to one of the first contact prongs, and
      the contact bushes are adapted to first contact elements, configured as contacting pins, for receiving them with positive engagement.

2. The rapid connection system as claimed in claim 1, wherein some of the first contact elements are configured as second contact prongs for penetrative contacting of cables which can be placed in the recesses of the mounting plate for at least one of signal transmission and backup power supply.

3. The rapid connection system as claimed in claim 1, wherein the device adapter is configured as a load feeder.

4. The rapid connection system as claimed in claim 1, wherein the first contact prongs with associated contact bushes are configured as one-piece second contact elements.

5. The rapid connection system as claimed in claim 1, wherein the contact bushes are mounted in the intermediate carrier using isolating threaded bolts.

6. The rapid connection system as claimed in claim 1, wherein short-circuit-current limiting elements, which respectively serve for the electrical protection of individual main power lines, are secured in the intermediate carrier.

7. The rapid connection system as claimed in claim 1, wherein the intermediate carrier is designed as a distributor with at least two contact bush arrangements with contact bushes.

8. The rapid connection system of claim 1, wherein the cables are form-coded flat cables.

9. The rapid connection system as claimed in claim 2, wherein the device adapter is configured as a load feeder.

10. The rapid connection system as claimed in claim 2, wherein the first contact prongs with associated contact bushes are configured as one-piece second contact elements.

11. The rapid connection system as claimed in claim 2, wherein the contact bushes are mounted in the intermediate carrier using isolating threaded bolts.

12. The rapid connection system as claimed in claim 2, wherein short-circuit-current limiting elements, which respectively serve for the electrical protection of individual main power lines, are secured in the intermediate carrier.

13. The rapid connection system as claimed in claim 12, wherein the short-circuit-current limiting elements are configured as fusible links, which are secured in the contact bushes.

14. The rapid connection system as claimed in claim 3, wherein the first contact prongs with associated contact bushes are configured as one-piece second contact elements.

15. The rapid connection system as claimed in claim 3, wherein the contact bushes are mounted in the intermediate carrier using isolating threaded bolts.

16. The rapid connection system as claimed in claim 3, wherein short-circuit-current limiting elements, which respectively serve for the electrical protection of individual main power lines, are secured in the intermediate carrier.

17. The rapid connection system as claimed in claim 16, wherein the short-circuit-current limiting elements are configured as fusible links, which are secured in the contact bushes.

18. The rapid connection system as claimed in claim 4, wherein, biased by springs, the second contact elements are mounted in the intermediate carrier.

19. The rapid connection system as claimed in claim 18, wherein the spring excursion of the second contact elements is limited by stops in the intermediate carrier.

20. The rapid connection system as claimed in claim 5, wherein, biased by springs, the second contact elements are mounted in the intermediate carrier.

21. The rapid connection system as claimed in claim 6, wherein the short-circuit-current limiting elements are configured as fusible links, which are secured in the contact bushes.

22. The rapid connection system as claimed in claim 21, wherein, biased by springs, the second contact elements are mounted in the intermediate carrier.

23. The rapid connection system as claimed in claim 6, wherein, biased by springs, the second contact elements are mounted in the intermediate carrier.

24. A method for the rapid connection of a device adapter to at least one of main power lines for the main power connection, signal lines and backup power lines, which are configured as cables, comprising:
   placing the cables in correspondingly formed recesses of a mounting plate;

connecting, to establish contact of the cable with respect to the main power connection, an intermediate carrier to the mounting plate;

penetrative contacting of first contact prongs, mounted in the intermediate carrier, with the main power lines of the cable;

swiveling the device adapter onto the mounting plate;

entering, at the end of the swiveling-on operation, contacting pins protruding on the side of the device adapter facing the mounting plate, into a positive connection with contact bushes of the intermediate carrier, which are respectively connected in an electrically conducting manner to one of the first contact prongs;

penetrative contacting second contact prongs, protruding from the device adapter, with at least one of signal lines and backup power lines, configured as cables.

25. The method of claim 24, wherein the cables are form-coded flat cables.

* * * * *